«12» United States Patent
Koh et al.

(10) Patent No.: US 7,910,243 B2
(45) Date of Patent: Mar. 22, 2011

(54) POLYMER BATTERY PACK

(75) Inventors: Seok Koh, Yongin-si (KR); Kyungwon Seo, Yongin-si (KR); Jeongdeok Byun, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 31 days.

(21) Appl. No.: 12/073,551

(22) Filed: Mar. 6, 2008

(65) Prior Publication Data
US 2008/0241654 A1 Oct. 2, 2008

(30) Foreign Application Priority Data
Mar. 28, 2007 (KR) .................. 10-2007-0030167

(51) Int. Cl.
H01M 2/00 (2006.01)
H01M 2/02 (2006.01)
H01M 2/10 (2006.01)
H01M 6/46 (2006.01)

(52) U.S. Cl. ......... 429/163; 429/176; 429/162; 429/100

(58) Field of Classification Search .................. 429/100, 429/38, 176, 153, 162, 163; 29/623.1; 174/112
See application file for complete search history.

(56) References Cited

U.S. PATENT DOCUMENTS

| 6,743,546 B1 * | 6/2004 | Kaneda et al. | 429/127 |
| 2003/0165736 A1 * | 9/2003 | Hiratsuka | 429/153 |
| 2003/0194597 A1 * | 10/2003 | Ganski et al. | 429/38 |
| 2004/0029000 A1 * | 2/2004 | Morita et al. | 429/162 |
| 2006/0263681 A1 * | 11/2006 | Lee | 429/176 |
| 2006/0266542 A1 * | 11/2006 | Yoon | 174/112 |

FOREIGN PATENT DOCUMENTS

| JP | 2000-067823 | 3/2000 |
| JP | 2001-307703 | 11/2001 |
| JP | 2004-327378 | 11/2004 |
| KR | 20-0380681 Y1 * | 4/2005 |

(Continued)

OTHER PUBLICATIONS

Machine translation of KR-20-038068 Y1; Shu, M; Apr. 2005.*

(Continued)

*Primary Examiner* — Jonathan Crepeau
*Assistant Examiner* — Kenneth Douyette
(74) *Attorney, Agent, or Firm* — Robert E. Bushnell, Esq.

(57) ABSTRACT

A thin polymer battery pack that can withstand a strong external impact includes: a pouch type bare cell having an exposed electrode tab: a circuit electrically coupled to the electrode tab of the pouch type bare cell; a frame case covering an upper part of the pouch type bare cell where the circuit is arranged, two short side parts having a narrow width connected to the upper part of the pouch type bare cell, and a lower part of the pouch type bare cell, two long side parts of a broader width than the two short side parts connected to an exposed upper part of the pouch type bare cell, and a reinforcement label having a metal layer to attach as a single body to both long side parts and the lower part of the pouch type bare cell.

12 Claims, 7 Drawing Sheets

FOREIGN PATENT DOCUMENTS

| | | |
|---|---|---|
| KR | 1020060028173 | 3/2006 |
| KR | 10-2006-0105208 A | 10/2006 |
| KR | 10-2006-0110405 A | 10/2006 |
| KR | 10-0664113 B1 | 12/2006 |
| KR | 2007/0025687 * | 3/2007 |
| WO | WO-2005/031897 A1 * | 4/2005 |
| WO | 2006104331 A1 | 10/2006 |

OTHER PUBLICATIONS

Machine translation of KR-2007/0025687, Kim, Gil-Ho, Mar. 2007.*

Chinese Office Action issued by Chinese Patent Office on Jun. 11, 2010 corresponding Chinese Patent Application No. 200810084122.8 with English translation attached.

* cited by examiner

POLYMER BATTERY PACK

CLAIM OF PRIORITY

This application makes reference to, incorporates the same herein, and claims all benefits accruing under 35 U.S.C. §119 from an application for POLYMER BATTERY PACK earlier filed in the Korean Intellectual Property Office on 28 Mar. 2007 and there duly assigned Serial No. 10-2007-0030167.

BACKGROUND OF THE INVENTION

1. Field of the Invention

The present invention relates to a polymer battery pack, and more particularly, the present invention relates to a polymer battery pack that can withstand a strong external impact and have a thin thickness.

2. Description of the Related Art

A related art polymer battery pack includes a lithium polymer battery, in which a protecting circuit is connected to a pouch type bare cell, and a case with a plastic frame that holds the lithium polymer battery. The pouch type bare cell receives an electrode assembly including a positive electrode plate/separator/negative electrode plate, and a polymer electrolyte in the interior of the pouch that consists of cast polypropylene (CPP)/aluminum/nylon (or polyethylene terephthalate (PET)). For reference, the polymer battery is named because it uses a polymer electrolyte, differently from a lithium-ion battery using a liquefied electrolyte.

On the other hand, the related art polymer battery pack can be easily damaged by an external shock such as bending, twisting and falling, etc. because the strength of the pouch and a plastic case surrounding it are weak. Therefore, it has problems that reduce stability and reliability.

In other words, the aluminum used for the pouch has a very thin foil shape, and the plastic case surrounding it is also very thin, so they can be easily deformed, broken and damaged by external force because of their weak strength.

Thus, the related art polymer battery pack is fabricated by after additionally attaching a reinforcing material made of stainless steel for reinforcing the strength of the pouch type bare cell connected to the protecting circuit, covering the pouch type bare cell with the plastic case, and then attaching label paper around the pouch type bare cell combined with the plastic case.

However, the reinforcing material made of stainless steel for reinforcing the strength of the related art polymer battery pack usually has a definite thickness of more than 0.1 mm and a definite weight. Therefore, it is difficult to make a thin polymer battery pack and reduce the weight of the polymer battery pack according to the trend of slimming and miniaturization of the battery pack.

Also, the related art polymer battery pack additionally includes the reinforcing material made of stainless steel. Therefore, it has problems to increase a manufacturing cost and the number of manufacturing processes due to the addition of the reinforcing material.

SUMMARY THE INVENTION

An object of the present invention is to provide a thin polymer battery pack using a thin reinforcement label that can withstand a strong external impact.

According to an aspect of the present invention, a polymer battery pack is provided including: a pouch type bare cell having an exposed electrode tab; a circuit electrically coupled to the electrode tab of the pouch type bare cell; a frame case covering an upper part of the pouch type bare cell where the circuit is arranged, the frame case including two short side parts having a narrow width connected to the upper part of the pouch type bare cell and a lower part of the pouch type bare cell, and including two long side parts of a broader width than the two short side parts and connected to an exposed upper part of the pouch type bare cell; and a reinforcement label having a metal layer, the label being attached as a single body to the two long side parts and the lower part of the pouch type bare cell.

An adhesive layer may be formed on one side of the metal layer, and information about the polymer battery pack may be printed on the other side of the metal layer.

The reinforcement label may include the adhesive layer formed on one side of the metal layer and a resin layer formed on the other side of the metal layer adjoining the outside.

The resin layer may be either polyethylene terephtalate or nylon.

The resin layer may be coated on the metal layer by a laminating method.

The metal layer of the reinforcement label may have a thickness in a range of from 0.02 to 0.04 mm.

The metal layer of the reinforcement label may be one of aluminum, stainless steel, and copper.

The frame case may include a plane part covering the upper part, the two short side parts and the lower part of the pouch type bare cell; and an extension part bend from an end of the plane part and extending toward each edge of the two long side parts of the pouch type bare cell to cover the edge of the two long side parts of the pouch type bare cell.

The reinforcement label may be attached to the two long side parts of the pouch type bare cell overlapping the extension part of the frame case and the lower part of the pouch type bare cell overlapping the plane part of the frame case.

The width of the plane part of the frame case covering the upper part of the pouch type bare cell may be greater than that of the plane part of the frame case covering the two short side parts of the pouch type bare cell.

A partial outer face of the extension part of the frame case may have the same height as the outer face of the reinforcement label. Another outer face of the extension part of the frame case, excluding the partial outer face of the extension part of the frame case, may have lower height than the outer face of the reinforcement label.

The partial outer face of the extension part of the frame case may be a region in which the reinforcement label is not attached, and the another outer face of the extension part of the frame case may be a region in which the reinforcement label is attached.

The pouch type bare cell may include an electrode assembly including a pouch, a positive electrode plate, a separator and a negative electrode plate, laminated and wound and arranged in the pouch, an electrolyte arranged in the pouch to enable Li ions to be transferred, and an electrode tab connected to the electrode assembly and exposed to the outside of the pouch.

The frame case may have an opening at the position corresponding to an external terminal so that the external terminal mounted on a printed circuit substrate included in the circuit can be exposed.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention are described in detail with reference to the accompanying drawings.

Figure 1:
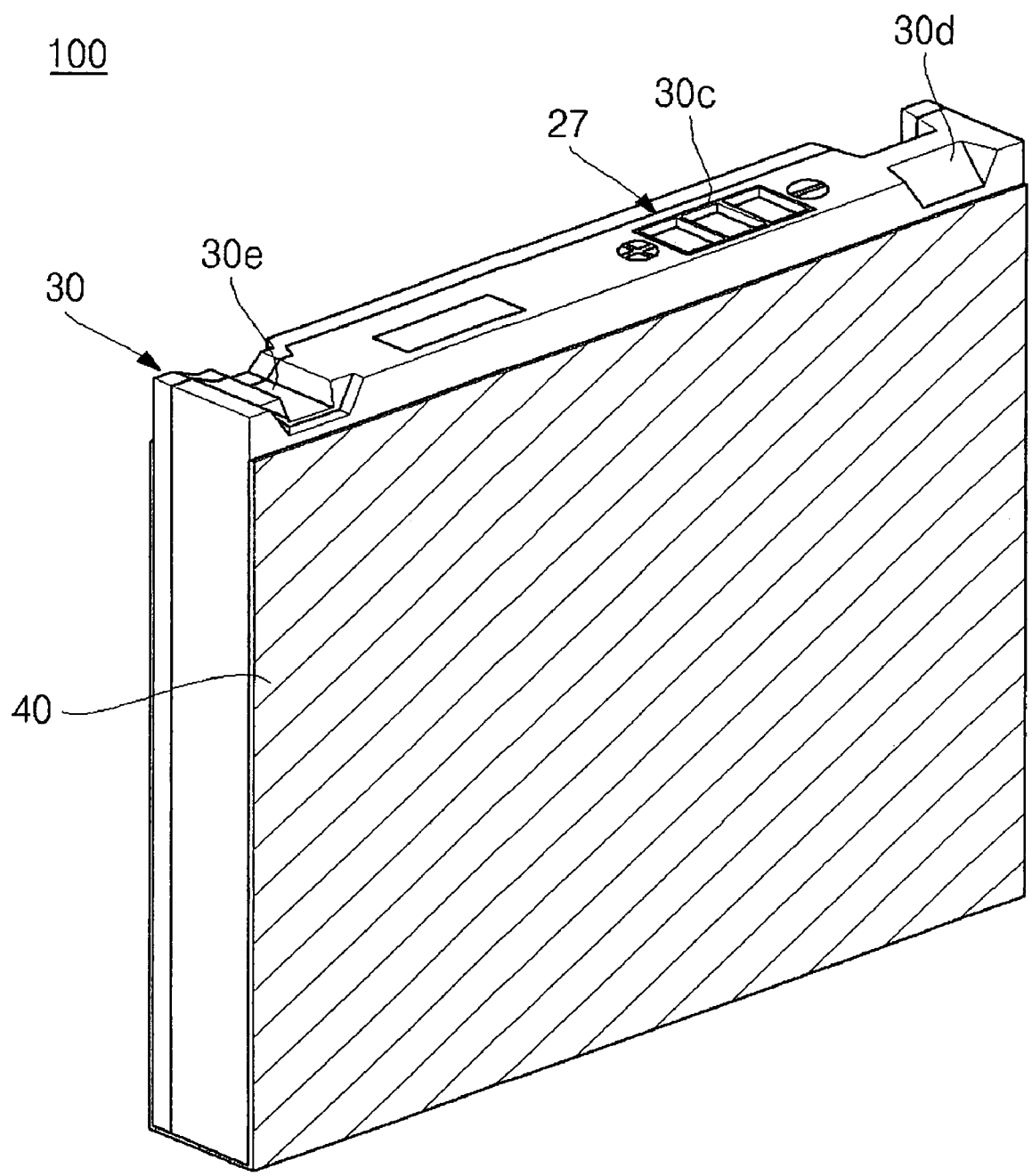
FIG. 1 is a perspective view of a polymer battery pack according to one exemplary embodiment of the present invention.
Figure 2:
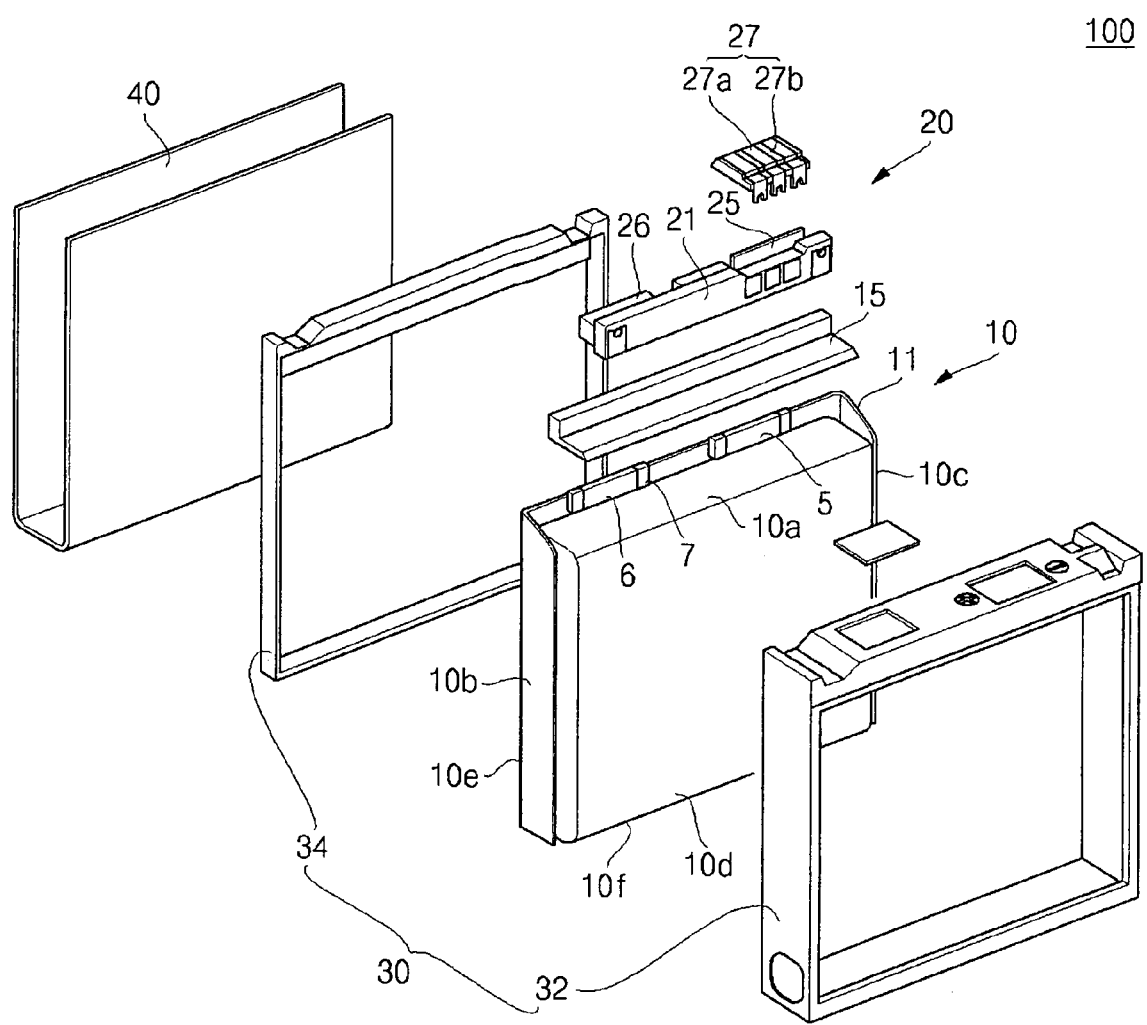
FIG. 2 is an exploded perspective view of the polymer battery pack according to one exemplary embodiment of the present invention.
Figure 3:
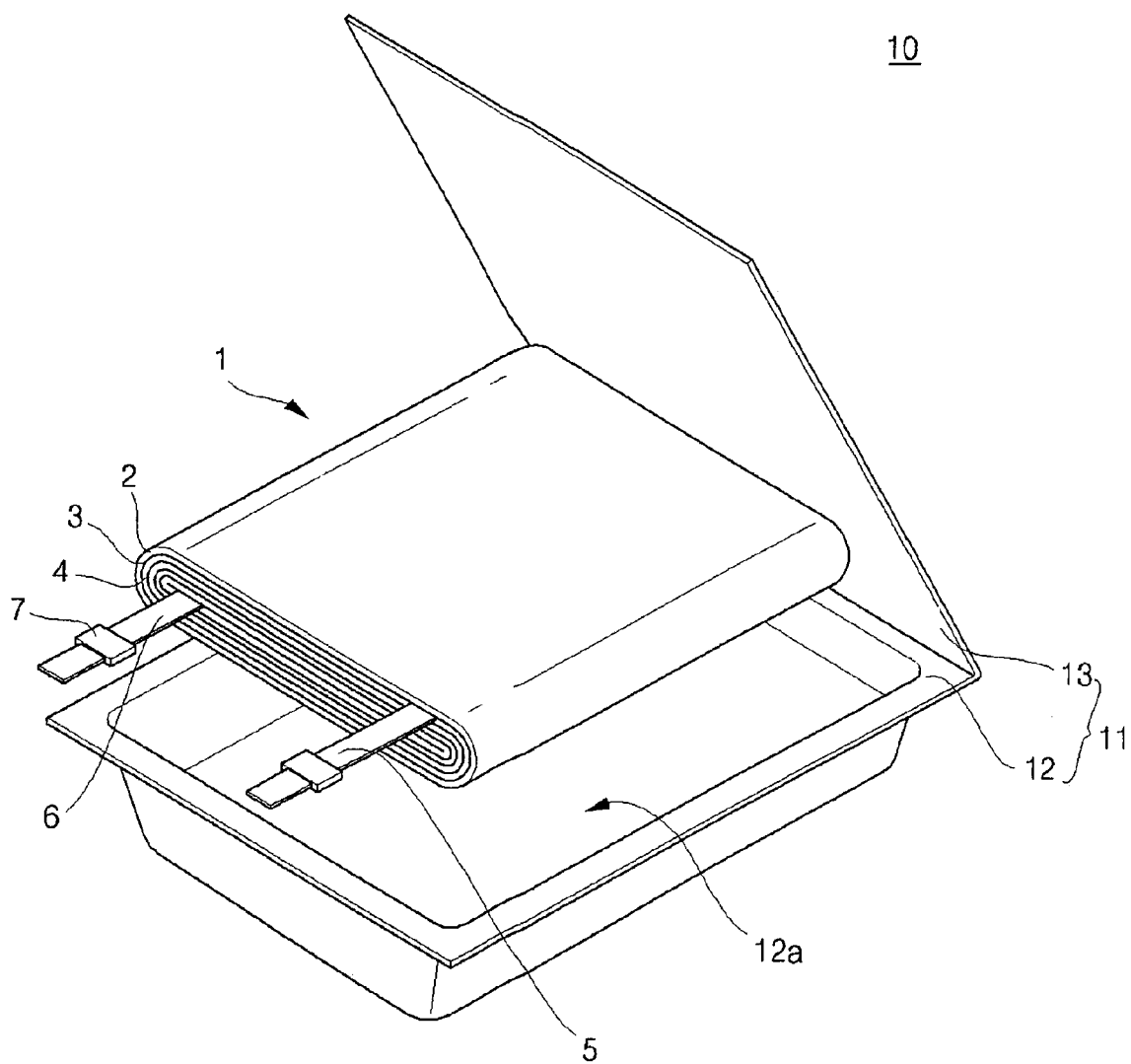
FIG. 3 is a perspective view of the state before sealing an electrode assembly in a pouch type bare cell of the polymer battery pack of FIG. 2.
Figure 4:
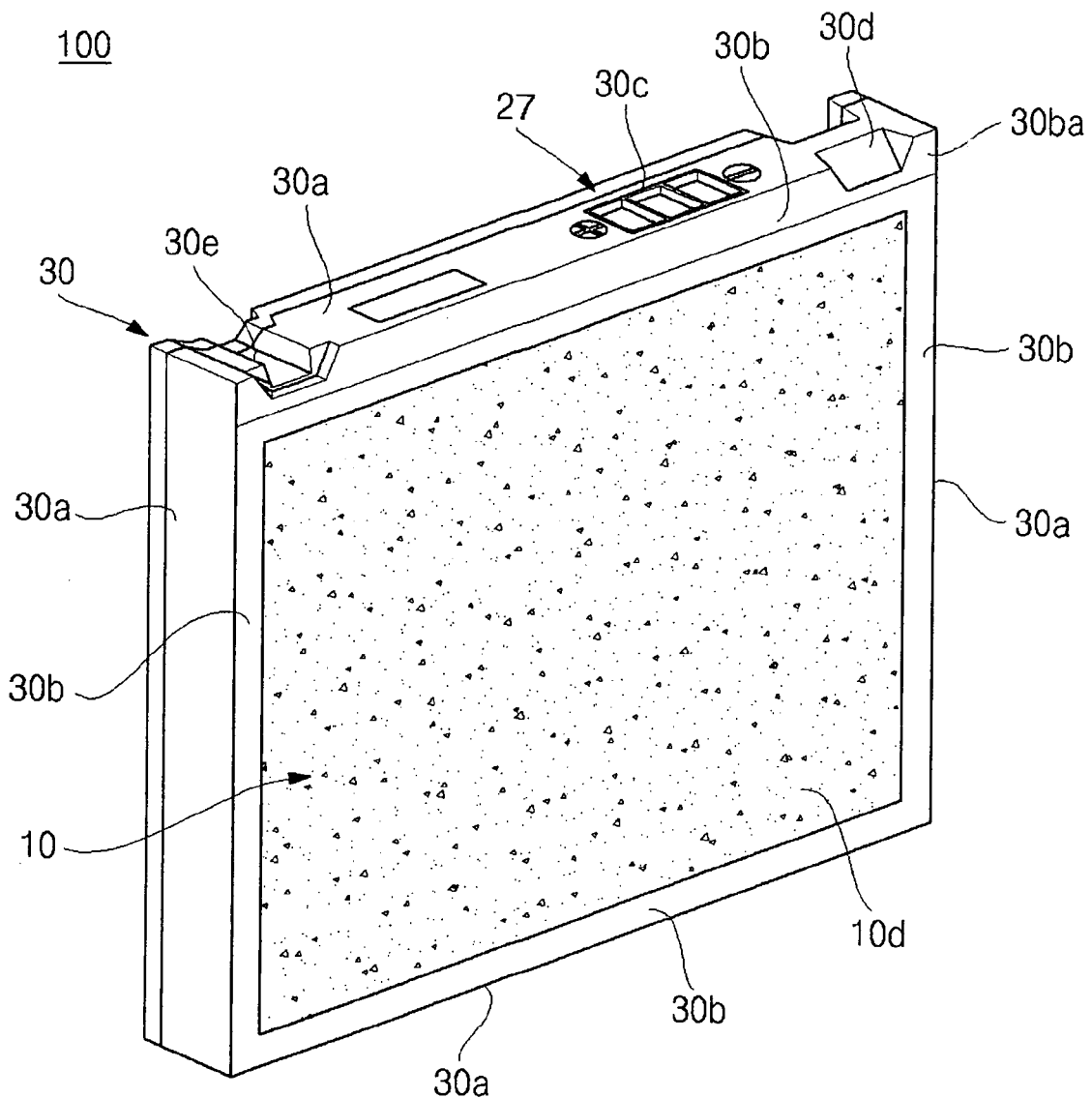
FIG. 4 is a perspective view of the state before a reinforcement label is attached to the polymer battery pack shown in FIG. 2.

FIG. 1 is a perspective view of a polymer battery pack according to one exemplary embodiment of the present invention. FIG. 2 is an exploded perspective view of a polymer battery pack according to one exemplary embodiment of the present invention. FIG. 3 is a perspective view of the state before sealing an electrode assembly in a pouch type bare cell of the polymer battery pack of FIG. 2. FIG. 4 is a perspective view of the state before a reinforcement label is attached to the polymer battery pack of FIG. 2.

Referring to FIGS. 1 to 4, the polymer battery pack 100 includes a pouch type bare cell 10, a circuit 20, a frame case 30 and a reinforcement label 40.

The pouch type bare cell 10 may be a rechargeable Li polymer battery containing a polymer electrolyte (or liquid electrolyte), and electrode tabs 5 and 6 having a predetermined length are exposed on its upper part. The charge and discharge of the pouch type bare cell 10 is performed by the electrode tabs 5 and 6.

Referring to FIG. 2, a pouch 11 includes two long edge sides having relatively wide area in the opposite direction, and four short edge sides having relatively narrow area along the edge of each long edge side. Three short edge sides among four short edge sides are thermally melted and attached to each other, and two short edge sides formed in the left and right directions along the height direction are bent at a predetermined angle in order to minimize the width of the pouch type bare cell 10. The electrode assembly wound several times is contained within the interior side of long edge sides and short edge sides that form the pouch 11.

Referring to FIG. 3, a general electrode assembly 1 is formed as so-called "jelly roll" by winding a multi-layered film laminated in the order of a positive electrode plate 2, a separator 3, and a negative electrode plate 4 in a whirlpool shape. When the jelly roll is wound and formed, a separator is added on an electrode face exposed to the outside of the roll or an inner electrode face to prevent the short circuit of the positive electrode plate 2 and the negative electrode plate 4.

The formed jelly roll is put into a groove 12a of a front face 12 of the pouch. Then, after covering the front face 12 of the pouch with a rear face 13 of the pouch, the pouch type bare cell battery is formed by heating and pressuring the edge side of the groove 12a under the state of adhesion, sealing up the pouch, and bending the short edge side of the pouch 11.

The ends of the electrode tabs 5 and 6 extending from each electrode plate of the electrode assembly are exposed to the outside of the sealed pouch 11. To prevent a short circuit between the electrode tabs 5 and 6 and the pouch 11, an insulation tape 7 may be used additionally.

The exposed electrode tabs 5 and 6 are electrically coupled to the circuit 20 of FIG. 2 needed for the stability of the battery. In other words, the circuit 20 is arranged on the upper part of the pouch type bare cell 10, that is, the upper part between short edge sides formed in the left and right directions, so the pouch type bare cell 10 and the circuit 20 are electrically coupled.

The circuit 20 includes a printed circuit substrate 21. The printed circuit substrate 21 includes a protecting circuit, such as a circuit (not shown) for equalizing the charge state by controlling the charge and the discharge to the battery or a circuit (not shown) for preventing overcharge and over discharge. Also, the circuit 20 may include a protecting element, such as a thermistor or a temperature fuse, each of which prevents danger, such as a fracture or fire, etc. by cutting off the current when the battery voltage or current is higher than its upper limit due to a high temperature rise or over discharge or overcharge of the battery, etc.

The circuit 20 also includes electrical connection terminals 25 and 26 mounted on the printed circuit substrate 21 for the electrical connection with the electrode tabs 5 and 6 of the pouch type bare cell 10.

The circuit 20 sends and receives electrical signals between the pouch type bare cell 10 and an external device (not shown). The circuit 20 further includes an external input/output terminal 27 having a role of an electrical medium between the circuit 20 and an external device in the upper part.

The external input/output terminal 27 includes a metal part 27a and a housing part 27b surrounding the metal part 27a.

The metal part 27a is plated by an electrically conductive material (e.g. gold), and passes an electric current between the pouch type bare cell 10 and an external device (not shown). A housing part 27b is made of plastic material (insulating material), and insulates the metal part 27a interposed in a fixed interval.

On the other hand, to prevent a short circuit due to the unnecessary connection between the circuit 20 and the pouch type bare cell 10, an insulation sheet 15 is further formed on an upper face of the pouch type bare cell 10.

As described above, the pouch type bare cell 10 that is electrically coupled to the circuit 20 via the electrode tabs 5 and 6 is combined with the frame case 30.

The frame case 30 is formed in a frame shape which covers an upper part 10a of the pouch type bare cell 10 on which the circuit 20 is arranged, a lower part 10f of the pouch type bare cell 10, and both short side parts 10b and 10c having a narrow width connected to the upper part 10a of the pouch type bare cell 10. Most of both long side parts 10d and 10e having a broad width connected to the upper part 10a of the pouch type bare cell 10 are exposed. The reason for forming the frame case 30 in a frame shape in the present invention is that it helps to make the polymer battery pack slim and lightweight. The frame case 30 is formed so as to cover the corner parts of both long side parts 10d and 10e of the pouch type bare cell 10.

In more detail, the frame case 30 includes a plane part 30a that covers the upper part 10a, both short side parts 10b and 10c and the lower part 10f of the pouch type bare cell 10, and an extension part 30b that is bent from the end of the plane part 30a parallel to the corner parts and extended toward both long side parts 10d and 10e of the pouch type bare cell 10 so as to cover the corner parts of both long side parts 10d, 10e of the pouch type bare cell 10. Each plane part 30a covering the upper part 10a, both short side part 10b and 10c and the lower part 10e of the pouch type bare cell 10 has same width.

An opening 30c is formed in the plane part 30a of the frame case 30 so as to be exposed to an external terminal 27 in a region corresponding to the external terminal 27 mounted on the printed circuit substrate 21 of the circuit 20 arranged on the upper part of the pouch type bare cell 10.

A lock 30d and hook 30e are formed in the frame case 30 to physically connect an external device to a polymer battery pack 100.

The frame case 30 is formed by combining a front frame case 32 facing to one long side part 10d of the pouch type bare cell 10 to a rear frame case 34 facing to the other short side part 10e of the pouch type bare cell 10, by a welding method, for example, ultrasonic welding.

As described above, the polymer battery pack 100 is fabricated by attaching the reinforcement label 40 after combining the frame case 30 into the pouch type bare cell 10 where the circuit 20 is arranged.

The reinforcement label 40 is formed in an approximately rectangular shape, attached as a single body to both long side parts 10d and 10e of the pouch type bare cell 10 overlapping with the extension part 30b of the frame case 30, and the lower part 10f overlapping with the plane part 30a so as to increase the coherence of the pouch type bare cell 10 and the frame case 30. The reinforcement label 40 is attached to cover the extension part 30b of the frame case 30 combined to the pouch type bare cell 10, but a part of the extension parts 30b are exposed so as not cause interference between the lock 30d and the hook 30e that are formed along the plane part 30a and the extension part 30b of the frame case 30.

The polymer battery pack 100 is completed by attaching the reinforcement label 40. The outer faces of the reinforcement label 40 and some 30ba of the extension parts 30b forming a part of the frame case 30 have a different height due to the thickness of the reinforcement label 40.

The reinforcement label 40 also protects the polymer battery pack 100 from external shock. The precise constitution of the reinforcement label 40 is explained in detail below with reference to FIG. 5.

Figure 5:
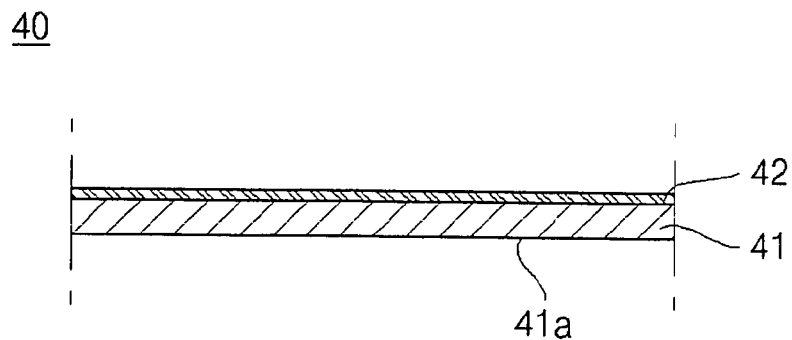
FIG. 5 is a cross-sectional view of the reinforcement label of FIG. 2.
Figure 6:
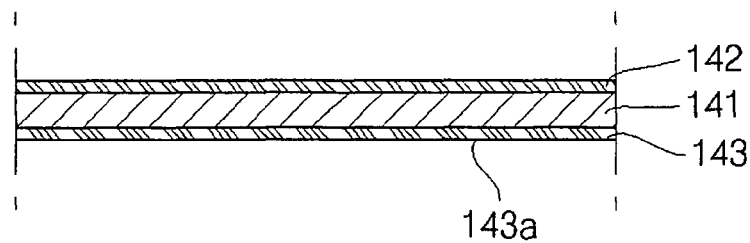
FIG. 6 is a cross-sectional view of the reinforcement label having a different constitution from the reinforcement label of FIG. 2.

FIG. 5 is a cross-sectional view of the reinforcement label of FIG. 2. FIG. 6 is a cross-sectional view of a reinforcement label having a different constitution from the reinforcement label of FIG. 2.

The reinforcement label 40 includes a metal layer 41 and an adhesive layer 42.

Referring to FIG. 5, the metal layer 41 of the reinforcement label 40 protects the polymer battery pack 100 from external shocks. The metal layer 41 is made of a metal having a high hardness and an anti-corrosion property, such as aluminum (Al), stainless steel(SUS), copper(Cu), a metal alloy, or their equivalents. However, the present invention is not limited thereto.

The metal layer 41 of the reinforcement label 40 is a thin plate with thickness of 0.02 mm to 0.04 mm. If the metal layer 41 is thinner than 0.02 mm, it is not enough to protect the pouch type bare cell 10 from external shocks, and if the metal layer 41 is thicker than 0.04 mm, the polymer battery pack becomes heavy.

Since the metal layer 41 of the reinforcement label 40 is thinner than the reinforcement metal material having thickness of about 0.1 mm and has the same function as a related art polymer battery pack, it has an advantage to make the battery pack thinner. Also, since the reinforcement label 40 replaces additional reinforcement material needed for the related art polymer battery pack, the processes for adding the additional reinforcement material are not necessary.

The adhesive layer 42 is formed on one face of the reinforcement label 40, and made of an adherent material, such as double-sided tape, so that the reinforcement label 40 can be attached to the pouch type bare cell 10.

Since information on the polymer battery pack 100 is directly printed on the other face that is not in contact with the adhesive layer 42 in the metal layer 41 of the reinforcement label 40, the user can read information on the polymer battery pack 100.

Referring to FIG. 6, a reinforcement label 140 includes a metal layer 141, an adhesive layer 142 and a resin layer 143.

Since the metal layer 141 and the adhesive layer 142 of the reinforcement label 140 are the same as that of the reinforcement label 40 of FIG. 5, a repeated explanation thereof has been omitted.

The resin layer 143 of the reinforcement label 140 is coated by a laminating method on the other face of the metal layer 141 whose one face contacts the adhesive layer 142. The resin layer 143 is exposed when the reinforcement label 140 is attached to the pouch type bare cell 10. Since information on the polymer battery pack 100 is printed on the face 143a that is not in contact with the metal layer 141, that is, the face facing outside, the user can read information on the polymer battery pack 100. The printing on the resin layer 143 is performed much easier than the printing on the metal layer 141 of FIG. 5. The resin layer 143 may be a printable material, such as PolyEthlene Terephtalate (PET) or Nylon.

Since the polymer battery pack according to one exemplary embodiment of the present invention is completed by the reinforcement label having a metal layer of a thin plate shape, it may realize a thinner polymer battery pack and have a higher external strength of the polymer battery pack than the related art polymer battery pack completed by attaching the reinforcement part of a thick metal material to the pouch type bare cell, combining with the case, and finishing with a label paper.

The polymer battery pack according to one exemplary embodiment of the present invention also increases the electric capacity per unit volume by the thickness being reduced due to the thin reinforcement label.

Since the polymer battery pack according to one exemplary embodiment of the present invention also removes additional reinforcement part of a metal material installed on the related art polymer battery pack, it may reduce the total manufacturing cost by reducing a material cost due to the additional parts, and simplify the process by reducing the processes needed for the additional parts.

Figure 7:
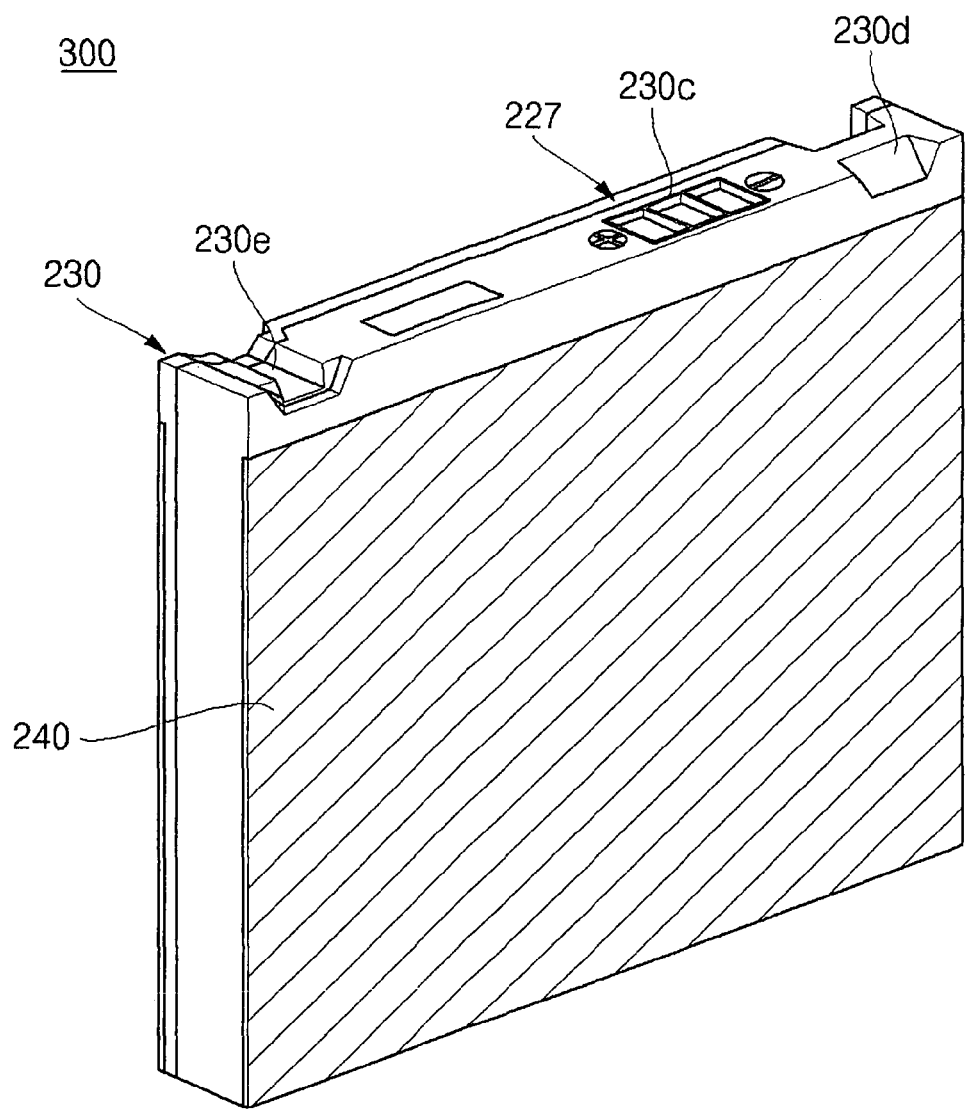
FIG. 7 is a perspective view of a polymer battery pack according to another exemplary embodiment of the present invention.
Figure 8:
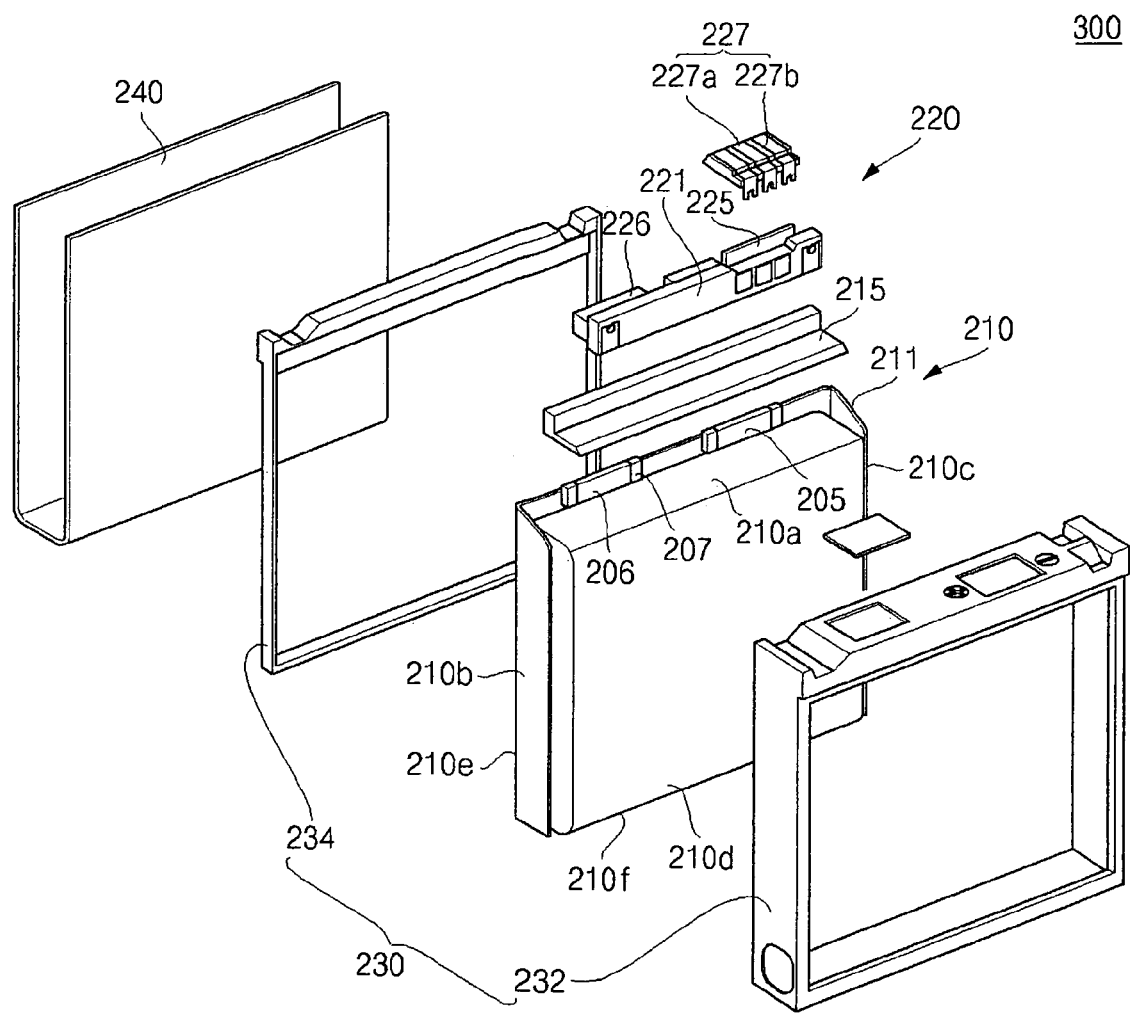
FIG. 8 is an exploded perspective view of the polymer battery pack according to another exemplary embodiment of the present invention.
Figure 9:
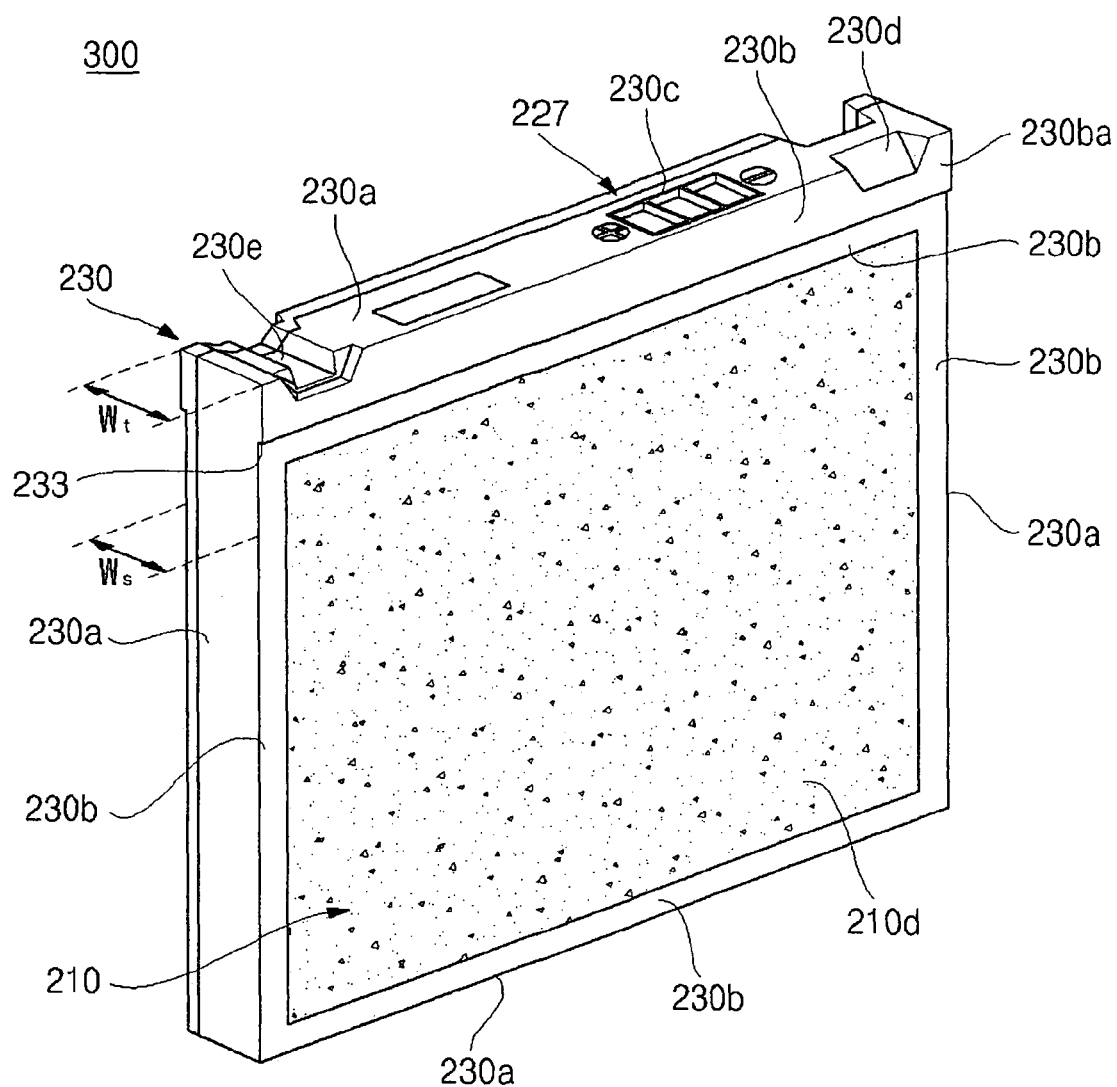
FIG. 9 is a perspective view of the state before a reinforcement label is attached to the polymer battery pack of FIG. 7.

FIG. 7 is a perspective view of a polymer battery pack according to another exemplary embodiment of the present invention. FIG. 8 is an exploded perspective view of the polymer battery pack according to another exemplary embodiment of the present invention. FIG. 9 is a perspective view of the state before a reinforcement label is attached to the polymer battery pack of FIG. 7.

The constituents of the polymer battery pack according to another exemplary embodiment of the present invention are the same as the polymer battery pack according to the previous exemplary embodiment of the present invention except for the structure of the frame case. Accordingly, a repeated explanation of the same constitution elements has been omitted, and the structure of the frame case 230 and the reinforcement label 240 attached to the frame 230 coupled to the pouch type bare cell 210 are described below in detail.

Referring to FIGS. 7 to 9, the polymer battery pack 300 according to another exemplary embodiment of the present invention includes the pouch type bare cell 210, the circuit 220, the frame case 230 and the reinforcement label 240.

The polymer battery pack 300 is completed by coupling the frame case 230 with the pouch type bare cell 210, electrically coupled to the circuit 220 via the electrode tabs 205 and 206, and covering the reinforcement label 240. The reason forming the frame case 230 in a frame shape in the present invention is that it helps to make the polymer battery pack slim and lightweight. The frame case 230 is formed so as to cover the corner parts of both long side parts 210d and 210e of the pouch type bare cell 210.

In more detail, the frame case 230 includes a plane part 230a for covering an upper part 210a, both short side parts 210b and 210c and a lower part 210f of the pouch type bare cell 210, and an extension part 230b that is bent from the end of the plane part 230a parallel to the corner parts so as to cover the corner part of both long side parts 210d and 210e of the pouch type bare cell 210, and extended toward both long side parts 210d and 210e of the pouch type bare cell 210.

The width (Wt) of the plane part 230a covering the upper part 210a of the pouch type bare cell 210 is wider than that (Ws) of the plane part 230a covering one short side part 210b of the pouch type bare cell 210, for example, in both short side parts 210b and 210c of the pouch type bare cell 210. Due to the difference between the width (Wt) of the plane part 230a covering the upper part 210a of the pouch type bare cell 210, and the width (Ws) of the plane part 230a covering one short side part 210b of the pouch type bare cell 210 in both short side parts 210b and 210c of the pouch type bare cell 210, a step height 233 is formed between the extension part 230b of the frame case 230 and the part 230ba of the extension part 230b, as shown in FIG. 9. The part 230ba of the extension part 230b of the frame case 230 may be a region that the reinforcement label 240 is not attached. The other extension part 230b of the frame case 230 may be a region that the reinforcement label 240 is attached except for the part 230ba of the extension parts 230b of the frame case 230.

The opening 230c is formed in the plane part 230a of the frame case 230 to expose the external terminal 227 in a region corresponding to the external terminal 227 mounted on the printed circuit substrate 221 of the circuit part 220 arranged on the upper part of the pouch type bare cell 210.

A lock 230d and a hook 230e are formed to physically connect an external device to the polymer battery pack 300 in the frame case 230.

The frame case 230 is completed by combining a front frame case 232 facing to one long side part 210d of the pouch type bare cell 210 to a rear frame case 234 facing to the other short side part 210e of the pouch type bare cell 210, by a welding method, for example, an ultrasonic welding.

As described above, the polymer battery pack 300 is completed by attaching the reinforcement label 240 after coupling the frame case 230 with the pouch type bare cell 210 where the circuit 220 is arranged.

The reinforcement label 240 is formed as an approximately rectangular shape, attached as a single body to both long side parts 210d and 210e of the pouch type bare cell 210 overlapping with the extension part 230b of the frame case 230, and a lower part 210f overlapping with the plane part 230a of the frame case 230 so as to increase the coherence of the pouch type bare cell 210 and the frame case 230. The reinforcement label 240 is attached to cover the extension part 230b of the frame case 230 coupled to the pouch type bare cell 210, but a part 230ba of the extension part 230b is exposed so as not to cause interference between the lock 230d and the hook 230e that are formed along the plane part 230a and the extension part 230b of the frame case 230.

When the polymer battery pack 300 is completed by attaching the reinforcement label 240, the outer face of the reinforcement label 400 and the outer face of the part 230ba of the extension part 230b, that is, the outer face of a part 230ba of the extension part 230b of the frame case 230 formed by bending from the end of the plane part 230a of the frame case 230 covering the upper part 210a and extending toward both long side parts 210d and 210e of the pouch type bare cell 210 have the same height. The other extension part 230b of the frame case 230 except the part 230ba of the extension part 230b has lower height than the outer face of the reinforcement label 240. As described above, this is a reason that the reinforcement label 400 is attached to the space made by the step height 233 formed between the extension part 230b of the frame case 230 and the part 230ba of the extension part 230b. The height difference between the outer face of the other extension part 230b of the frame case 230 and the outer face of the reinforcement label 240 is made to be the same as the thickness of the reinforcement label 240, thereby allowing the battery pack to be thin.

The reinforcement label 240 also protects the polymer battery pack 300 from external shocks.

A description of the reinforcement label 240 has been omitted because it has the same constitution as the reinforcement label 40 according to the previous exemplary embodiment of the present invention.

The polymer battery pack 300 according to the another exemplary embodiment of the present invention includes the frame case 230 having a step height 233 and the reinforcement label 240 having a metal layer, so that the polymer battery pack 300 is thinner than the polymer battery pack 100 according to the previous exemplary embodiment of the present invention, and the external strength of the polymer battery pack 300 can be increased by attaching the reinforcement label 240 to the space formed by the step height 233.

Since the polymer battery pack 300 according to the another exemplary embodiment of the present invention also removes additional reinforcement part of a metal material installed to the related art polymer battery pack, the total manufacturing costs are reduced by reducing the material cost due to the additional parts and simplifying the process by reducing the processes needed for the additional parts.

The polymer battery pack according to the present invention produces the following effect.

First, the reinforcement label having the metal layer of thin plate is used instead of the reinforcement part of metal material additionally attached to the polymer battery pack, thereby increasing the strength and realizing the thin battery pack.

Second, the polymer battery pack removes additional reinforcement part of the metal material, thereby reducing the total manufacturing cost by decreasing the material cost due to the additional part and simplifying the total process by reducing the process for the additional part.

Third, the polymer battery pack can increase the electric capacity per unit volume due to the reduced thickness due to the thin reinforcement label.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as being limitations of the present invention.

What is claimed is:

1. A polymer battery pack comprising:
a pouch type bare cell having an exposed electrode tab;
a circuit electrically coupled to the electrode tab of the pouch type bare cell;
a frame case covering an upper part of the pouch type bare cell where the circuit is arranged, the pouch type bare cell including two short side parts connected to the upper part of the pouch type bare cell and a lower part of the pouch type bare cell, and including two long side parts of a broader width than the two short side parts and connected to an exposed upper part of the pouch type bare cell; and
a reinforcement label having a metal layer, the label being attached as a single body to the two long side parts and the lower part of the pouch type bare cell,
wherein the frame case comprises a plane part that covers the upper part, the two short side parts and the lower part of the pouch type bare cell and wherein the frame case further comprises an extension part bent from an end of the plane part, and extended toward a corner of the two long side parts of the pouch type bare cell to cover the corner part of the two long side parts of the pouch type bare cell, and
wherein the plane part of the frame case covering the upper part of the pouch type bare cell is wider than the plane part of the frame case covering the two short side parts of the pouch type bare cell, and
wherein the plane part of the frame case covering the upper part of the pouch type bare cell is contiguous with and a continuation of the plane part of the frame case covering the two short side parts of the pouch type bare cell.

2. The polymer battery pack of claim 1, wherein an adhesive layer is arranged on one face of the metal layer, and information on the polymer battery pack is printed on the other face of the metal layer.

3. The polymer battery pack of claim 1, wherein the reinforcement label comprises an adhesive layer arranged on one face of the metal layer and a resin layer arranged on the other face of the metal layer.

4. The polymer battery pack of claim 3, wherein the resin layer comprises either polyethylene terephtalate or nylon.

5. The polymer battery pack of claim 3, wherein the resin layer is coated on the metal layer by a laminating method.

6. The polymer battery pack of claim 1, wherein the metal layer of the reinforcement label has a thickness in a range of 0.02 mm to 0.04 mm.

7. The polymer battery pack of claim 1, wherein the metal layer of the reinforcement label comprises one of aluminum, stainless steel, and copper.

8. The polymer battery pack of claim 1, wherein the reinforcement label is attached to the two long side parts of the pouch type bare cell overlapping the extension part of the frame case, and wherein the lower part of the pouch type bare cell overlaps the plane part of the frame case.

9. The polymer battery pack of claim 1, wherein a partial outer face of the extension part of the frame case, bent from an end of the plane part of the frame case covering the upper part of the pouch type bare cell and extending toward the two long side parts of the pouch type bare cell, has the same height as the outer face of the reinforcement label, and wherein another outer face of the extension part of the frame case, excluding the partial outer face of the extension part of the frame case, has a lower height than the outer face of the reinforcement label.

10. The polymer battery pack of claim 9, wherein the partial outer face of the extension part of the frame case includes a region where the reinforcement label is not attached, and wherein the another outer face of the extension part of the frame case includes a region where the reinforcement label is attached.

11. The polymer battery pack of claim 1, wherein the pouch type bare cell comprises: a pouch; an electrode assembly having a positive electrode plate, a separator and an negative electrode plate that are stacked and wound together and arranged in the pouch; an electrolyte arranged in the pouch to enable Li ions to be transferred; and an electrode tab connected to the electrode assembly and exposed to the outside of the pouch.

12. The polymer battery pack of claim 1, wherein the frame case has an opening at a position corresponding to an external terminal to expose the external terminal mounted on a printed circuit substrate included in the circuit.

* * * * *